Patented July 31, 1928.

1,678,760

UNITED STATES PATENT OFFICE.

ARTHUR BINZ, OF BERLIN, AND CURT RÄTH, OF RANGSDORF, GERMANY.

PROCESS FOR THE PREPARATION OF ARSENIC COMPOUNDS.

No Drawing. Application filed July 13, 1926, Serial No. 122,266, and in Germany July 22, 1925.

The object of this invention is the preparation of compounds containing two arsenic molecules, connected by a double bond, of the general formula $R-As=As-R_1$ whereïn $R$ and $R_1$ may be similar or dissimilar, substituted or unsubstituted, aliphatic, isocyclic or heterocyclic organic radicals.

We have discovered that this type of compound can be prepared by treating a mixture of an arsine and an arsonic acid with a reducing agent whereby a reduction of the arsonic acid takes place followed immediately by a condensation to form the desired compound. Another method of preparing this type of compound is described in our copending application filed on even date herewith.

In carrying out the process of this invention the arsine and the arsonic acid are first mixed in an acidic aqueous solution in a molecular ratio, an excess of a reducing agent, such as hypophosphite of sodium, is then added in successive small amounts to the cooled solution. On standing for a short while the condensation product $R-As=As-R_1$ precipitates.

A further advantage of our invention is the fact that the formation of the arseno compounds from the mixture takes place in the cold. Hereby a solubility of the resulting product is obtained which is considerably better than when working with application of heat.

Examples.

(1) 5.5 grams of 2-hydroxy-5-pyridyl arsonic acid were dissolved in 100 cc. of water containing an equimolecular amount of sodium hydroxide; this solution was then acidified with an excess of hydrochloric acid. An aqueous hydrochloric acid solution of 4-hydroxy-3-amino phenyl arsine produced in the well known way from 7 grams 4-hydroxy-3-amino phenyl arsonic acid was then stirred in and the mixture cooled. 1 gram potassium iodide and 10 grams sodium hypophosphite were then added and the mixture well agitated out of contact with the air. After standing for about half an hour 10 grams of sodium hypophosphite were again added and the mixture allowed to stand over night. A slight precipitate or cloudiness due to the formation of the condensation product appeared shortly after adding the first portion of the reducing agent, this precipitate rapidly increased. After standing the product appeared as a flocculent precipitate which was filtered off and washed with hydrochloric acid, water and ether. Yield 94% of the theoretical. The reaction takes place according to the following equation:

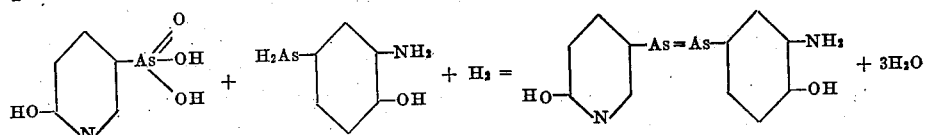

(2) 2.1 grams of 2-hydroxy-5-pyridyl arsonic acid were dissolved in 50 cc. water and 10 cc. concentrated hydrochloric acid. To the cold solution is added a solution of 4-hydroxy-3-aminophenyl arsine, which has been produced by reducing 3 grams 4-hydroxy-3-nitrophenylarsonic acid by means of zinc dust and hydrochloric acid. 0.5 gram potassium iodide and 5 grams sodium hypophosphite are then added to the cold clear mixture. After stirring for half an hour another 5 grams sodium hypophosphite are added. The mixture is then allowed to stand out of contact with air for 12 hours. About 94% yield were obtained. The reaction takes place according to the following equation:

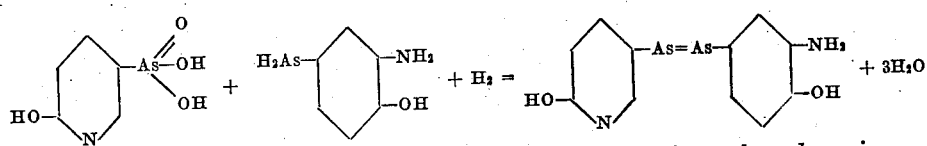

(3) 2.9 grams 3-brom-2-hydroxy-5-pyridyl arsonic acid were dissolved in 50 cc. concentrated hydrochloric acid. A solution of 4-hydroxy-3-amino phenyl arsine which is produced by reducing 4-hydroxy-3-nitrophenyl arsonic acid by means of zinc dust and hydrochloric acid is added to the cold solution. 0.5 gram potassium iodide and 5 grams sodium hypophosphite are then added to the cold, slightly turbid mixture. The mixture is agitated for ½ hour and 5 grams sodium hypophosphite are again added. The mixture is allowed to stand for 12 hours out of contact with air. The precipitate formed is filtered off. Yield 90%. On raising the temperature and adding more reducing agent no further deposit was formed. The reaction takes place according to the following equation:

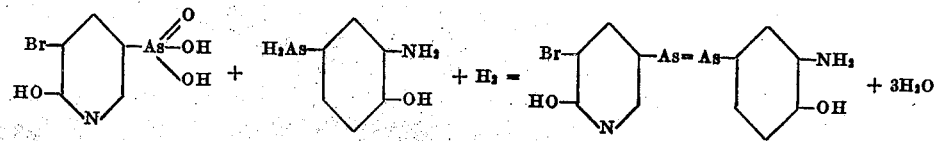

(4) 2.1 grams 2-hydroxy-pyridyl-5-arsonic acid were dissolved in 10 cc. concentrated hydrochloric acid. To the solution is added a solution of 4-aminophenylarsine obtained by reducing 2.2 grams arsonilic acid with zinc dust and hydrochloric acid. On mixing the solutions a precipitate is formed immediately. 0.5 gram potassium iodide and 5 grams sodium hypophosphite are added. The mixture is agitated for ½ hour; subsequently 5 grams sodium hypophosphite are again added and the mixture is allowed to stand for 12 hours out of contact with air. A yield of 90% was obtained. The reaction takes place according to the following equation:

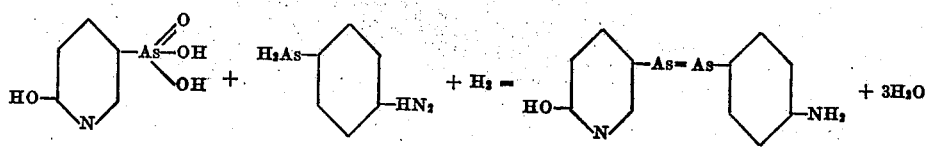

(5) 1.8 grams 3-amino-4-hydroxy-phenyl arsonic acid are dissolved in 50 cc. concentrated hydrochloric acid. To the cold solution is added a solution of 4-hydroxy-3-amino phenyl arsine obtained by reducing 3 grams 4-hydroxy-3-nitrophenyl arsonic acid with zinc dust and hydrochloric acid. 0.5 gram potassium iodide and 5 grams sodium hypophosphite are added to the cold clear solution. After agitating for ½ hour 5 grams sodium hypophosphite are again added. The mixture is then allowed to stand for 12 hours out of contact with air. The clear solution is then run into 100 cc. concentrated hydrochloric acid. The arsphenamine is purified by dissolving it in methanol whereby it is separated from inorganic materials and subsequently precipitated by passing the solution into other. Yield 90% The reaction takes place according to the following equation:

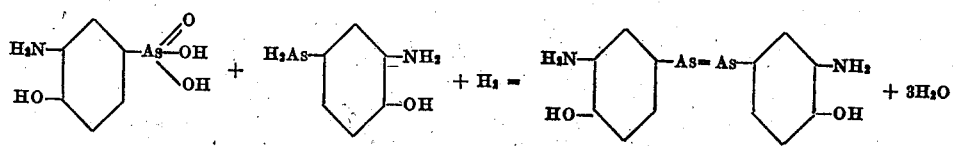

What we claim is:

1. Process for the preparation of arsenic compounds containing the group —As=As— which comprises reducing an organic arsonic acid in the presence of an organic arsine containing the group —AsH$_2$ by means of a reducing agent.

2. Process for the preparation of arsenic compounds containing the group —As=As— which comprises reducing an organic arsonic acid in the presence of an organic arsine containing the group —AsH$_2$ in acid solution by means of a reducing agent.

3. Process for the preparation of arsenic compounds containing the group —As=As— which comprises mixing an acidic aqueous solution of an organic arsonic acid and an organic arsine containing the group —AsH$_2$, adding thereto an excess of a reducing agent and allowing the components to react at room temperature.

4. Process for the preparation of arsenic compounds containing the group —As=As— which comprises reducing an organic arsonic acid in the presence of an organic arsine containing the group —AsH$_2$, one of which arsenic compounds at least is a heterocyclic compound, by means of a reducing agent.

Signed at Berlin, Brandenburg, Prussia, this 22nd day of June, A. D. 1926.

ARTHUR BINZ.
CURT RÄTH.